Feb. 11, 1969  R. M. TUCK  3,426,622

TRANSMISSION

Filed April 20, 1966

INVENTOR.
Robert M. Tuck
BY
Charles R. White
ATTORNEY

United States Patent Office 3,426,622
Patented Feb. 11, 1969

3,426,622
TRANSMISSION
Robert M. Tuck, Indianapolis, Ind., assignor to General Motors Corporation, Detroit, Mich., a corporation of Delaware
Filed Apr. 20, 1966, Ser. No. 543,952
U.S. Cl. 74—730      4 Claims
Int. Cl. F16b 47/00

ABSTRACT OF THE DISCLOSURE

Dual turbine torque converter transmission in which each turbine drives separate forward-drive gear units which are drivingly connected to a transmission output by the engagement of a single, selectively engageable clutch unit. The transmission includes a geared direct mechanical drive, and also has first turbine drive of reverse drive gearing and a power takeoff.

---

This invention relates to power transmissions and more particularly to an improved transmission employing a dual-turbine torque converter and a multiratio range unit providing a plurality of forward ratios and a reverse ratio drive.

This transmission incorporates a multiphase torque converter, having a dual turbine and a change-speed range unit for further changing converter torque multiplication. In this transmission, there are two torque-multiplying phases of convereter operation. The highest reduction ratios are provided in a first operating phase in which first and second turbine torques are combined and further multiplied by a first ratio provided by the range unit. An intermediate reduction ratio, on hydraulic shift of the converter into a second phase of converter operation, occurs as the first turbine torque decreases to zero. Converter torque multiplication is through operation of the second turbine, which is further multiplied by a second ratio of the range gearing. In a direct drive, a third ratio of the range unit is employed to change transmission operation to mechanical direct drive with converter output being uncoupled from the range unit. A reverse drive is accomplished through the first turbine torque combined by a spur gear train provided by the range unit.

This transmission provides a good range of operating ratios and has a high overall efficiency with a desirable spread of efficiency peaks. Only one power shift is necessary for complete forward drive operation of the transmission. This shift is for high range, direct, mechanical drives. The power transmitted mechanically for higher range drives gives increased efficiency for this part of the transmission operation.

Figure 1:
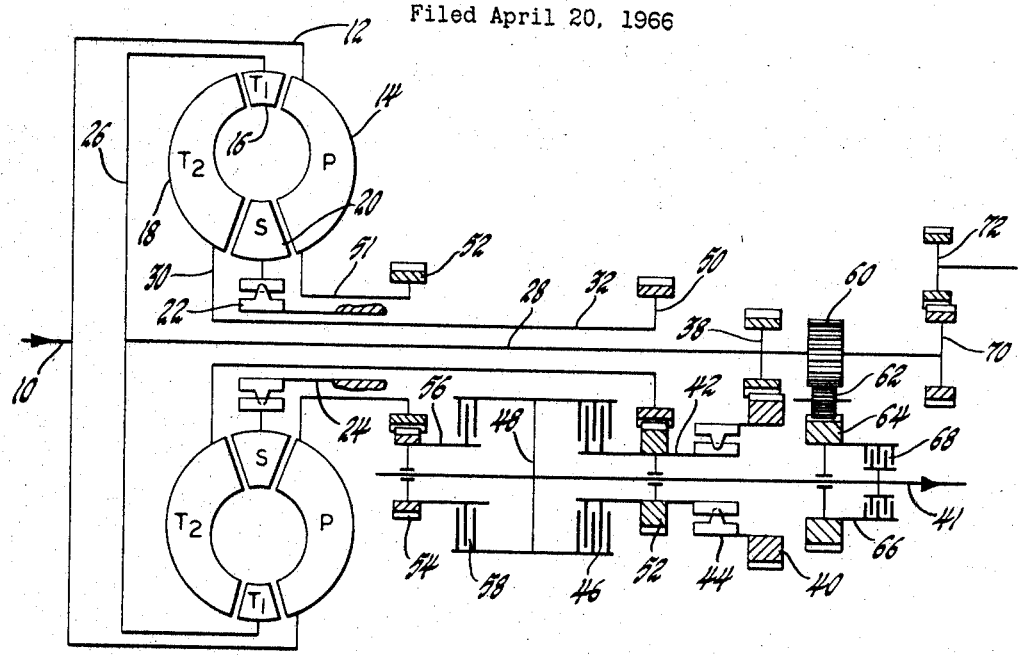
FIGURE 1 is a diagrammatic showing of the torque converter and transmission gearing of this invention.

The transmission, as illustrated in FIGURE 1, has an input shaft 10, driving a rotary torque converter housing 12, and connected torque converter pump 14. The torque converter includes, in addition to pump 14, a first turbine 16, a second turbine 18, and a stator 20, which have conventional inner and outer shells with blading therebetween, providing a torque converter torus chamber in which the fluid circulated by pump 14 flows initially to the first turbine 16 to drive that turbine with an initially high torque at stall and a gradually decreasing to zero torque at middle range speed ratio, for example .5 speed ratio. This is illustrated as curve $TT_1$ in the graph of FIGURE 2. The fluid circulates from the first turbine to the second turbine 18 which has small positive or negative torque at stall. Second turbine torque increases to about .5 speed ratio as the torque of the first turbine decreases. Second turbine torque then gradually decreases to coupling. This is illustrated as curve $TT_2$ in FIGURE 2.

From the second turbine, the working fluid flows through the stator 20 and back to the pump 14. The stator 20 may be connected by a suitable oneway brake 22 to ground sleeve 24. The first turbine 16 is connected by drum 26 to an output shaft 28, and the second turbine 18 is connected by hub 30 to the second turbine output sleeve shaft 32.

First turbine output shaft 28 drives a spur gear 38, which meshes with a spur gear 40, rotatably mounted on an intermediate shaft 41, providing a first ratio in the range gear unit, which will be further described below. The spur gear 40 is connected to a sleeve shaft 42, concentric with output shaft 41 by a one-way clutch 44. A clutch 46 may be selectively operated by a motor mechanism, operated by controls which are not illustrated, to couple sleeve shaft 42 to shaft 41. As shown, drum 48, housing the clutch, is coupled to the output shaft 41. The second turbine output shaft 32 drives a spur gear 50, which meshes with the spur gear 52, secured to sleeve shaft 42. This provides a second ratio in the range gear unit. As illustrated, this ratio is an overdrive ratio. Engagement of clutch 46 will simultaneously couple spur gears 50 and 52 to the shaft 41 for converter operation as will appear below.

Figure 2:
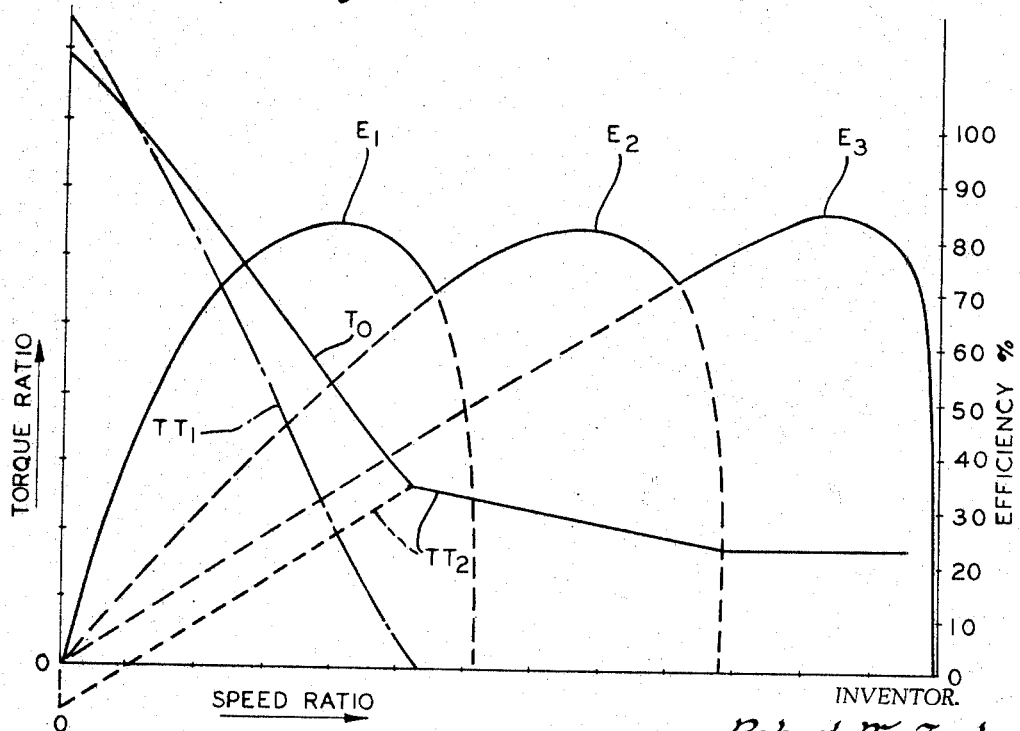
FIGURE 2 is a graph which shows the transmission operating curves.

The first turbine spur gear set 38 and 40 provides a speed-reducing and torque-multiplying first ratio of, for example 2.5:1. The second turbine drives the spur gear set 50 and 52, and provides a speed-increasing, torque-reducing second ratio, for example .826:1, to provide a reduced torque on the output shaft 41. Illustrative torque curves for this unit are shown in FIGURE 2 where the "torque ratio" is the output torque on shaft 41 over the input torque on input shaft 10. The torque delivered by the first turbine to output shaft 41 is the torque of the first turbine times the first ratio and is shown by curve $TT_1$. The torque delivered by the second turbine to the shaft 41 is the torque of the second turbine times the second ratio and is shown by the curve $TT_2$. Curve $T_o$ is the sum of $TT_1$ and $TT_2$, and illustrates output torque on shaft 41.

Pump 14 drives sleeve shaft 51 and connected spur gear 52. Spur gear 52 meshes with spur gear 54, mounted on a sleeve shaft 56, which is concentric with drive shaft 41. A clutch 58 is selectively operable to couple and uncouple the ratio provided by gears 52 and 54 to drum 48, and thus to output shaft 41. This latter mentioned ratio preferably provides a speed-increasing, torque-reducing ratio to further increase the output speed in a high drive range which will be described later. If an overall drive ratio of 1:1 is desired, gears 52 and 54 will have equal pitch diameters. Or, if a speed-reducing ratio is desired, gear 54 will have a larger pitch diameter than that of gear 52.

The shaft 28 also has coupled thereto a spur gear 60, which meshes with an idler 62, which in turn meshes with the spur gear 64, that is mounted on sleeve shaft 66. A clutch 68 is operable to connect the spur gear 64 and sleeve shaft 66 to the output shaft 41 for a reverse drive range.

Another spur gear 70 is secured to the end of the first turbine driven shaft 28 which meshes with a spur gear 72 to provide a power takeoff for operation of an accessory not illustrated. Any suitable ratio may be used for the power takeoff.

In drive range, a first phase of converter operation occurs in which the transmission produces maximum torque and maximum speed reduction. This is accomplished by apply of clutch 46; and, with all other clutches released, converter torque multiplication, as will appear from the torque curves of FIGURE 2, is primarily from the first turbine. This torque is further multiplied by the first ratio provided by spur gears 38 and 40. As will be appreciated, second turbine torque is combined with the first turbine torque, since both ratios are coupled to sleeve shaft 42, and clutch 46 is engaged.

In a second phase of the drive range, in which there is intermediate speed reduction and intermediate torque multiplication ratios, the first turbine speed has progressively increased until its torque becomes zero. The second turbine torque, which gradually reduces as second turbine speed increases in second phase operation is further reduced by the ratio of spur gears 50 and 52. The one-way clutch at this time overruns to eliminate power regeneration back into the converter by way of spur gears 40 and 38 and shaft 28. Thus, the output shaft 41 is driven at intermediate reduction ratios and at corresponding increases in speed. At converter coupling, the second turbine speed equals pump speed and a direct, mechanical, high range drive is accomplished by releasing clutch 46 and engaging clutch 58. This direct mechanical drive gives an increased efficiency for a part of the operating range of the transmission. As pointed out before, spur gears 52 and 54 provide a desired, high-range ratio which may be an overdrive ratio.

Reverse is obtained by applying clutch 68 and releasing clutches 46 and 58. First turbine torque is multiplied by the ratio of spur gears 60 and 64, to drive the output shaft in a reverse direction.

As shown in FIGURE 2, the efficiency curves $E_1$ for first phase operation, $E_2$ for second phase operation, and $E_3$ for direct mechanical drive operation combine to illustrate all-over transmission efficiency. Thus, it is apparent that the transmission of this is highly efficient in a wide range of ratios, with an improved efficiency in an intermediate range, or in the second phase of converter operation, and the efficient, high-range transmission operation.

From the above, it will be seen that the transmission is a straightforward transmission and provides a good range of operating ratios and provides the benefits of direct-drive, high-range as well as smooth, hydraulic shift from first to second phase converter operation.

Having described the embodiment of my invention, it will be understood that many other embodiments may be made utilizing the teaching of the specification and the drawings. It will be appreciated that I am not to be limited to that which is particularly shown and described, but only by the claims.

I claim:

1. In a power transmission, an input member, an output member, a hydrodynamic torque converter having fluid pump means operatively connected to said input member and having first and second turbines, first gearset means providing a first gear ratio operatively connected to said first turbine, second gearset means providing a second gear ratio operatively connected to said second turbine, a first clutch having first and second selectively engageable friction means for connecting said first and second gearset means to said output member to condition said transmission for first and second range hydraulic drives, said first friction means being directly connected to at least one of said gearset means, said second friction means being directly connected to said output member, third gearset means operatively connected to said input means, a second selectively engageable clutch having first friction means operatively connected to said third gearset means and having second friction means directly connected to said output member, said second clutch being selectively engageable to condition said transmission for a geared direct drive.

2. In a power transmission, an input member, an output member, a hydrodynamic torque converter having fluid pump means operatively connected to said input member and having first and second turbines, first gearset means providing a first forward drive ratio operatively connected to said first turbine, second gearset means providing a second forward drive ratio operatively connected to said second turbine, a first selectively engageable clutch having first friction means operatively connected to said first and second gear means and having second friction means directly connected to said output member, said friction means of said first clutch being engageable to condition said transmission for first and second range hydraulic drives, third gear means operatively connected to said input means, a second selectively engageable clutch having first friction means operatively connected to said third gear means and having second friction means directly connected to said output member, said second clutch being selectively engageable to condition said transmission for a geared mechanical drive, fourth gearset means operatively connected to said first turbine for providing a reverse drive and third selectively engageable clutch means for selectively connecting said fourth gearset means to said output member.

3. In a power transmission, an input member, an output member, a hydrodynamic torque converter having fluid pump means operatively connected to said input member and having first and second turbines, first gearset means providing a first ratio operatively connected to said first turbine, second gearset means providing a second ratio operatively connected to said second turbine, a first selectively engageable clutch having first friction means operatively connected to said first and second gear means and having second friction means directly connected to said output member, said friction means of said first clutch being engageable to condition said transmission for first and second range hydraulic drives, third gear means operatively connected to said input means, a second selectively engageable clutch having first friction means operatively connected to said third gear means and having second friction means directly connected to said output member, said friction means of said second clutch being selectively engageable to condition said transmission for a geared direct mechanical drive, a reverse drive gearset operatively connected to said first turbine, third selectively engageable clutch means for selectively connecting said reverse drive gearset to said output member, and a power takeoff gear unit having an input gear operatively connected to said first turbine and an output gear driven by said input gear.

4. In a power transmission, an input member, an output member, a hydrodynamic torque converter including a pump operatively connected to said input member and including first and second turbines, a first drive shaft operatively connected to said first turbine, a first forward drive gear unit operatively connected by said first drive shaft to said first turbine, a second drive shaft operatively connected to said second turbine, a second forward drive gear unit operatively connected by said second drive shaft to said second turbine, one-way clutch means operatively connecting said first and second gear units, a selectively engageable friction clutch operatively connecting said first and second gear units and said transmission output member and engageable to condition said transmission for a plurality of forward hydraulic drives, a third gear unit operatively connected to said input, a selectively engageable friction clutch operatively connecting said third gear unit and said output member and engageable to condition said transmission for a forward all-mechanical drive, a reverse drive gear unit operatively connected to said first turbine through said first drive shaft, clutch means for selectively connecting said reverse drive unit to said output member, and fifth gear means operatively connected to said first turbine through said first drive shaft having an output providing a power takeoff.

References Cited

UNITED STATES PATENTS

| | | | |
|---|---|---|---|
| 2,737,061 | 3/1956 | Kelley | 74—732 |
| 3,256,751 | 6/1966 | Tuck et al. | 74—718 |
| 2,623,411 | 12/1952 | Herndon | 74—730 |
| 2,772,581 | 12/1956 | Maier et al. | 74—732 |
| 3,256,751 | 6/1966 | Tuck et al. | 74—718 |

FOREIGN PATENTS

| | | |
|---|---|---|
| 109,886 | 12/1939 | Sweden. |
| 151,202 | 12/1960 | Russia. |

DONLEY J. STOCKING, *Primary Examiner.*

T. HAMPSHIRE, *Assistant Examiner.*

U.S. Cl. X.R.

74—718, 732